Aug. 4, 1936. F. C. FISK 2,049,952
MACHINE AND METHOD FOR MANUFACTURING CONTAINERS
Filed Aug. 9, 1933 11 Sheets-Sheet 2
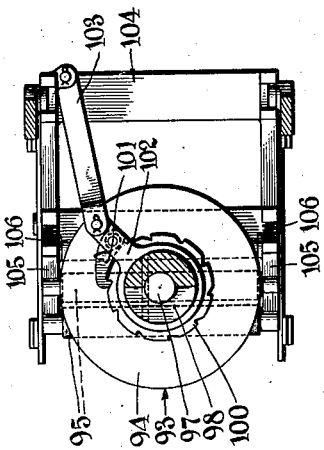
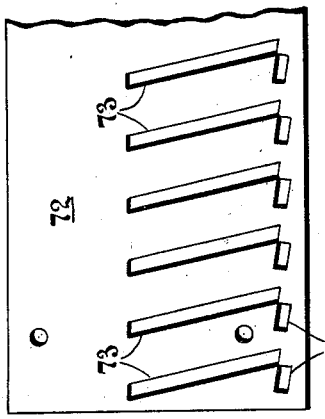
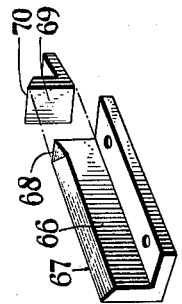
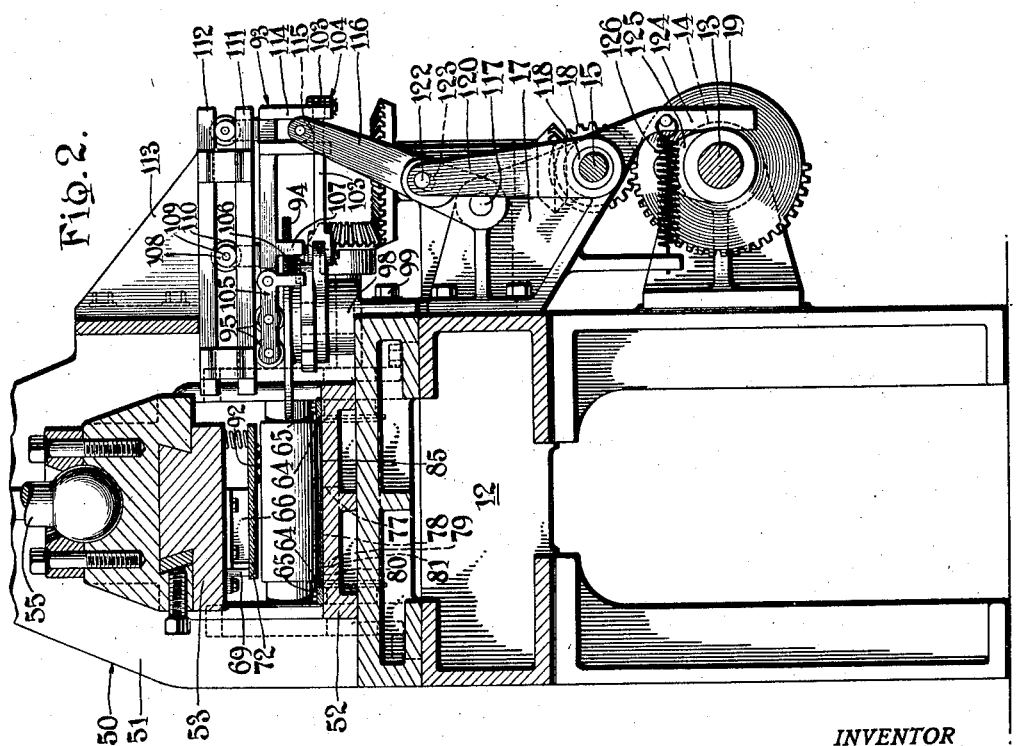
INVENTOR
Frederick C. Fisk,
BY
Beau & Brooks
ATTORNEYS

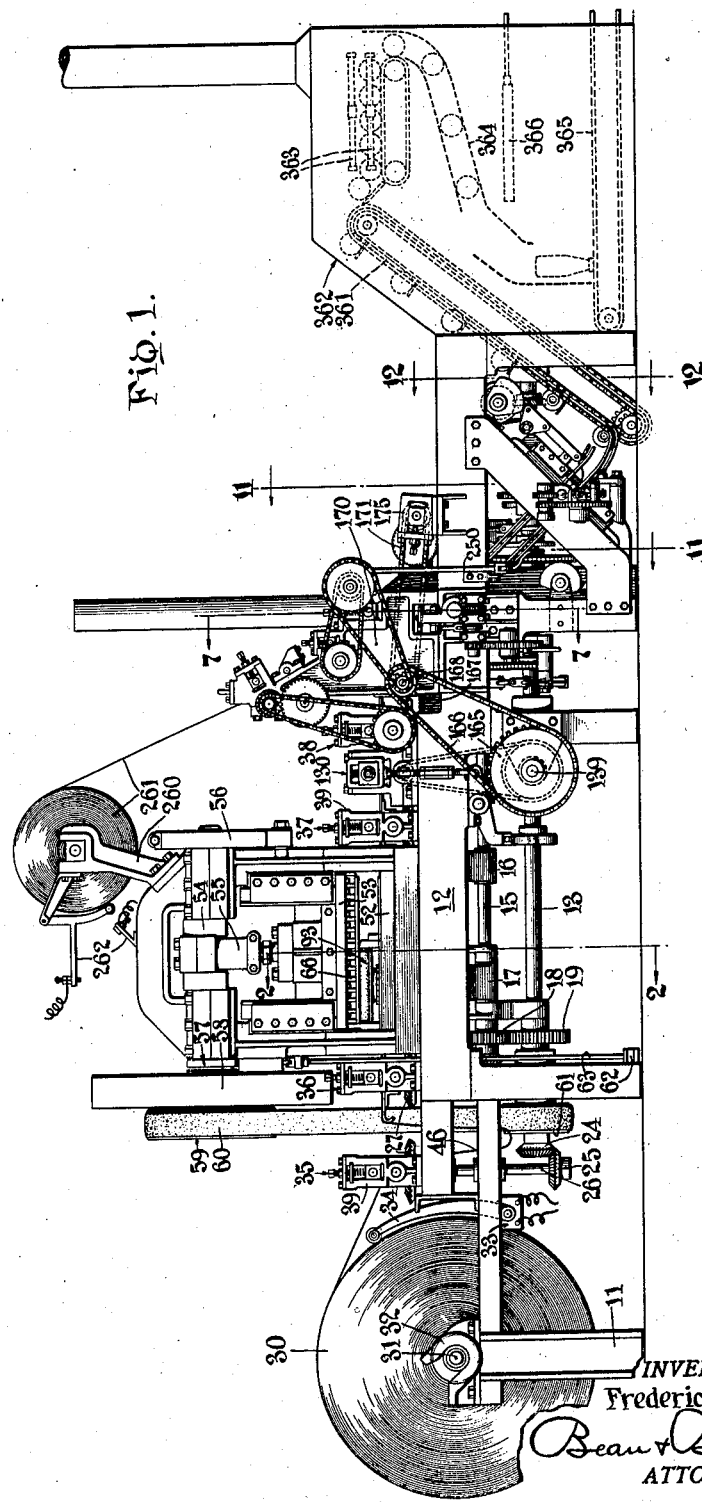

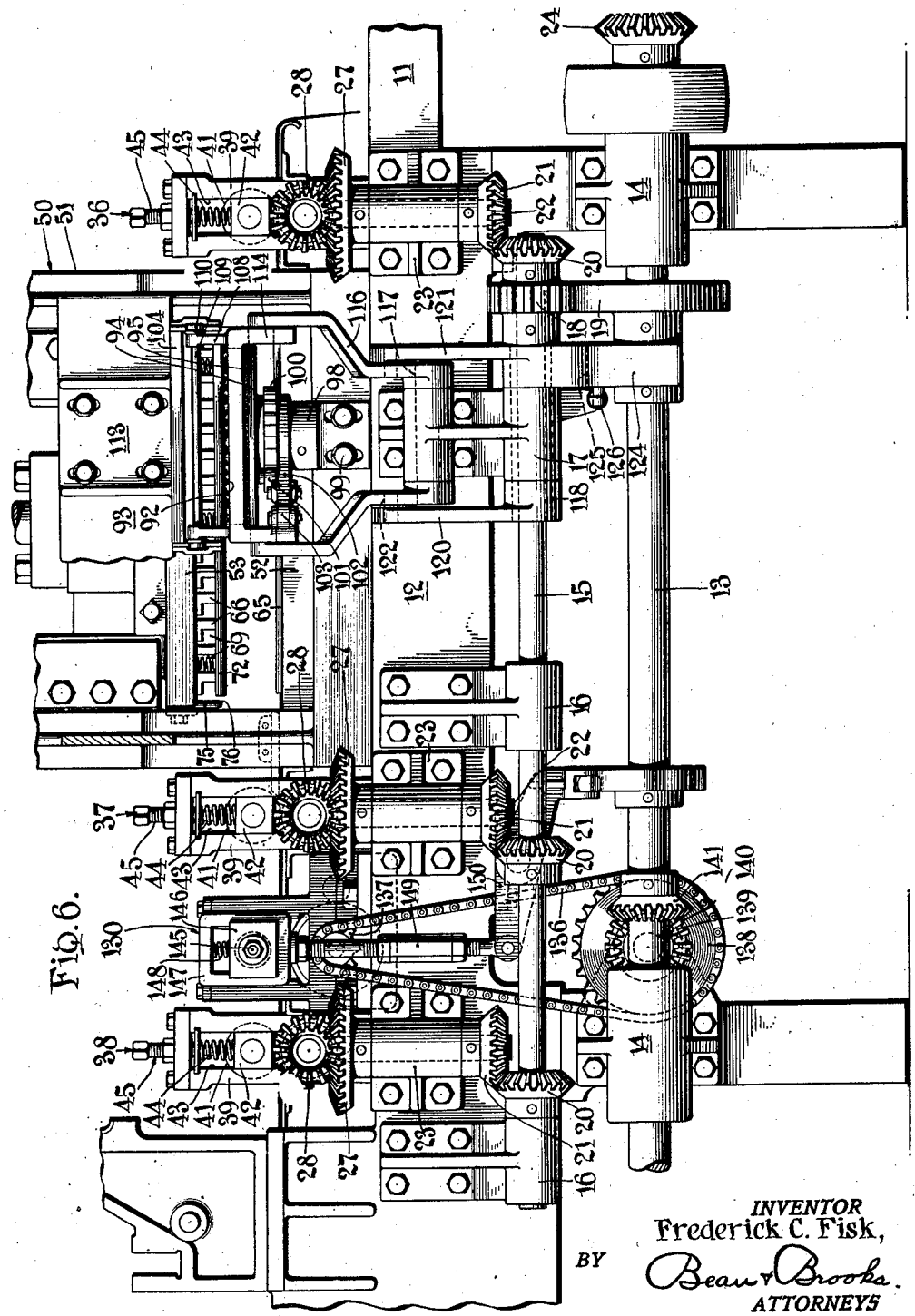

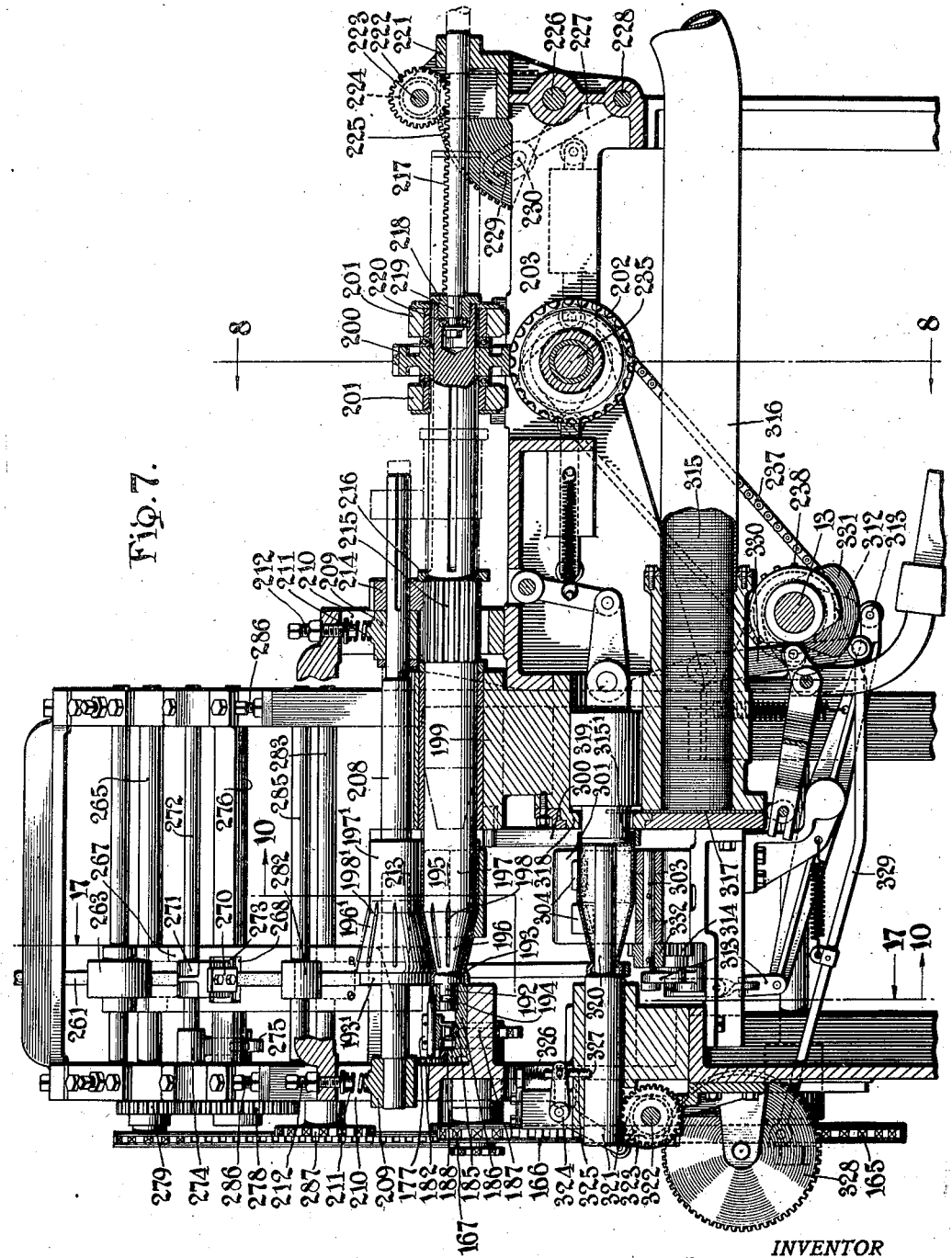

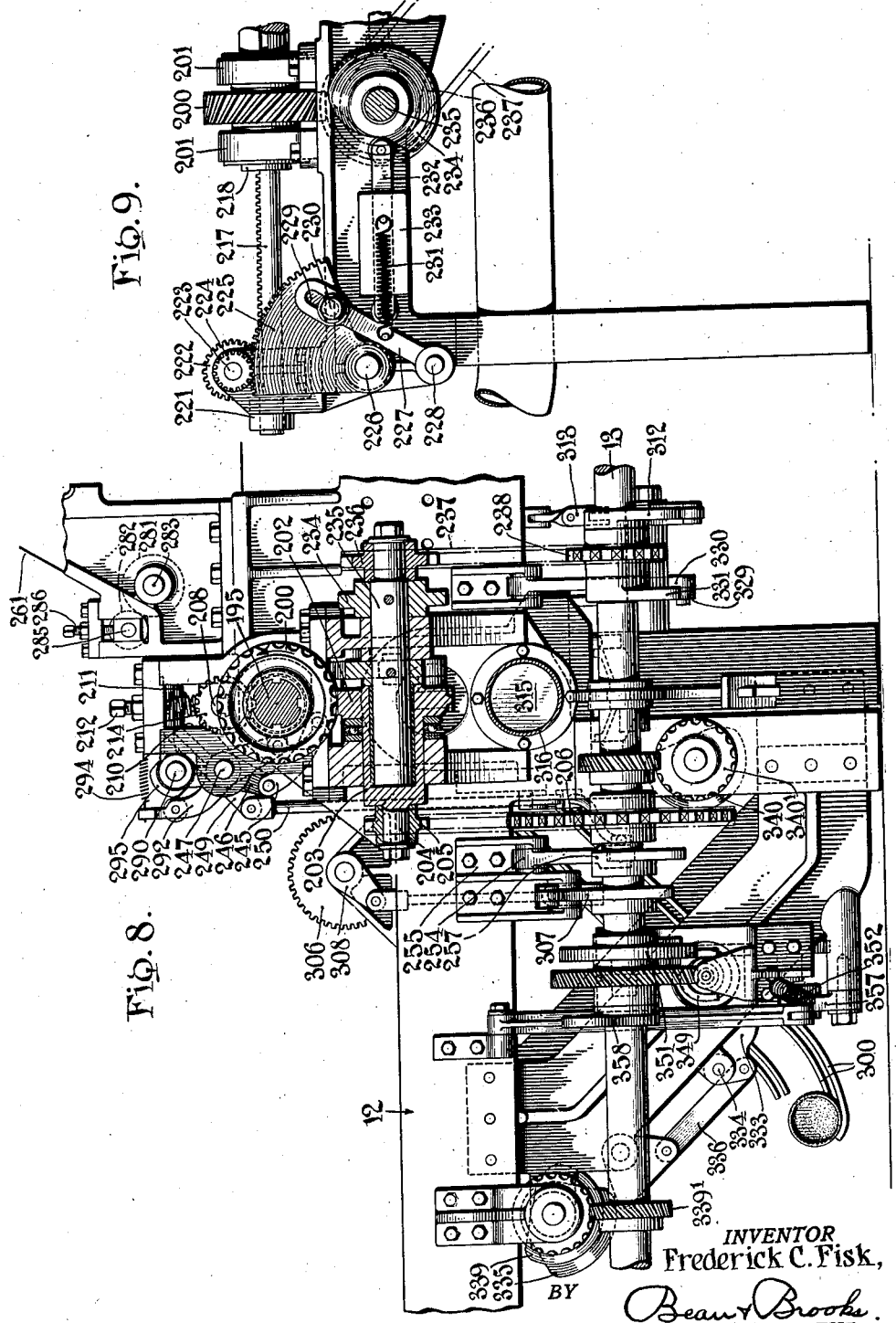

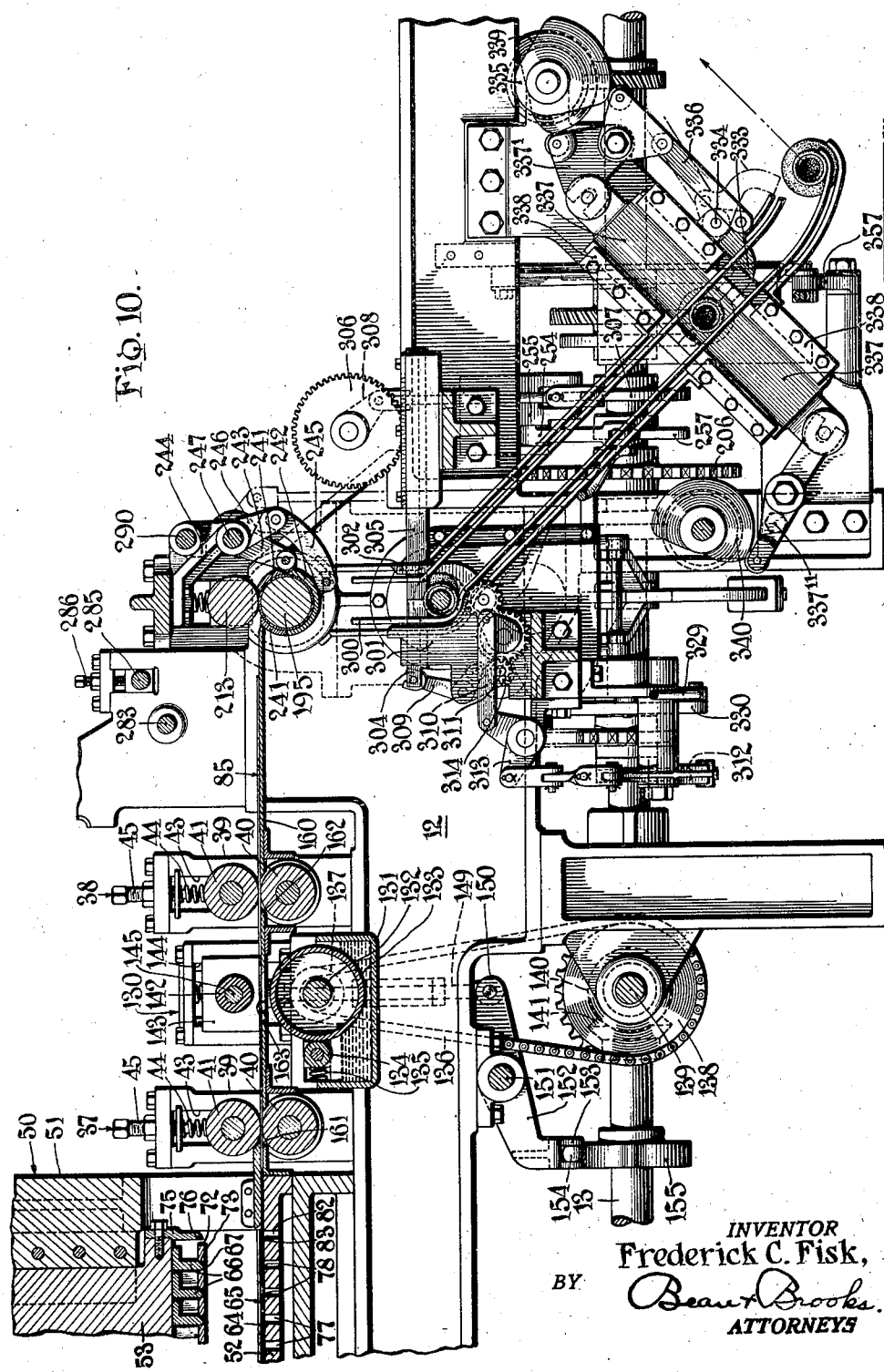

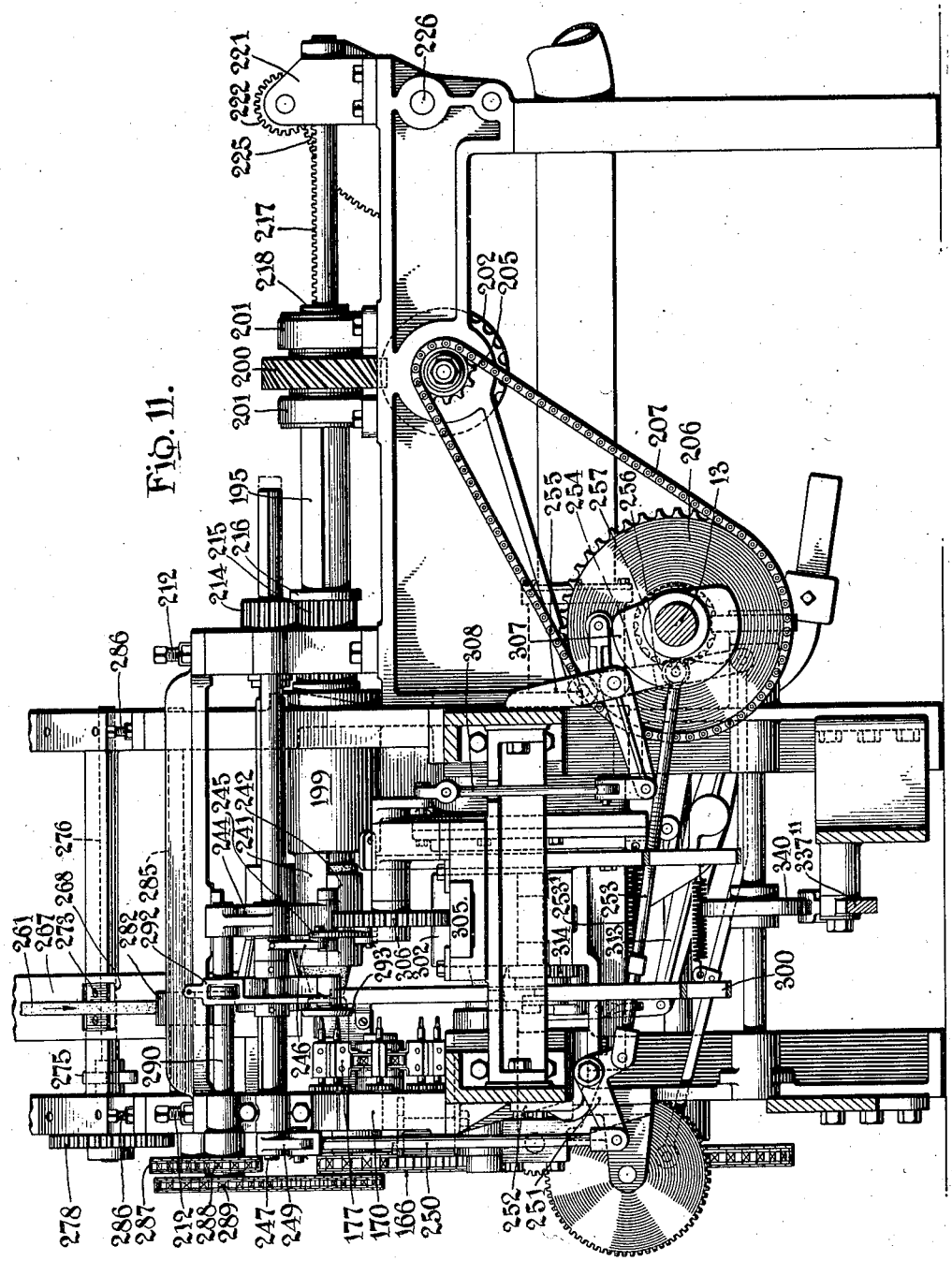

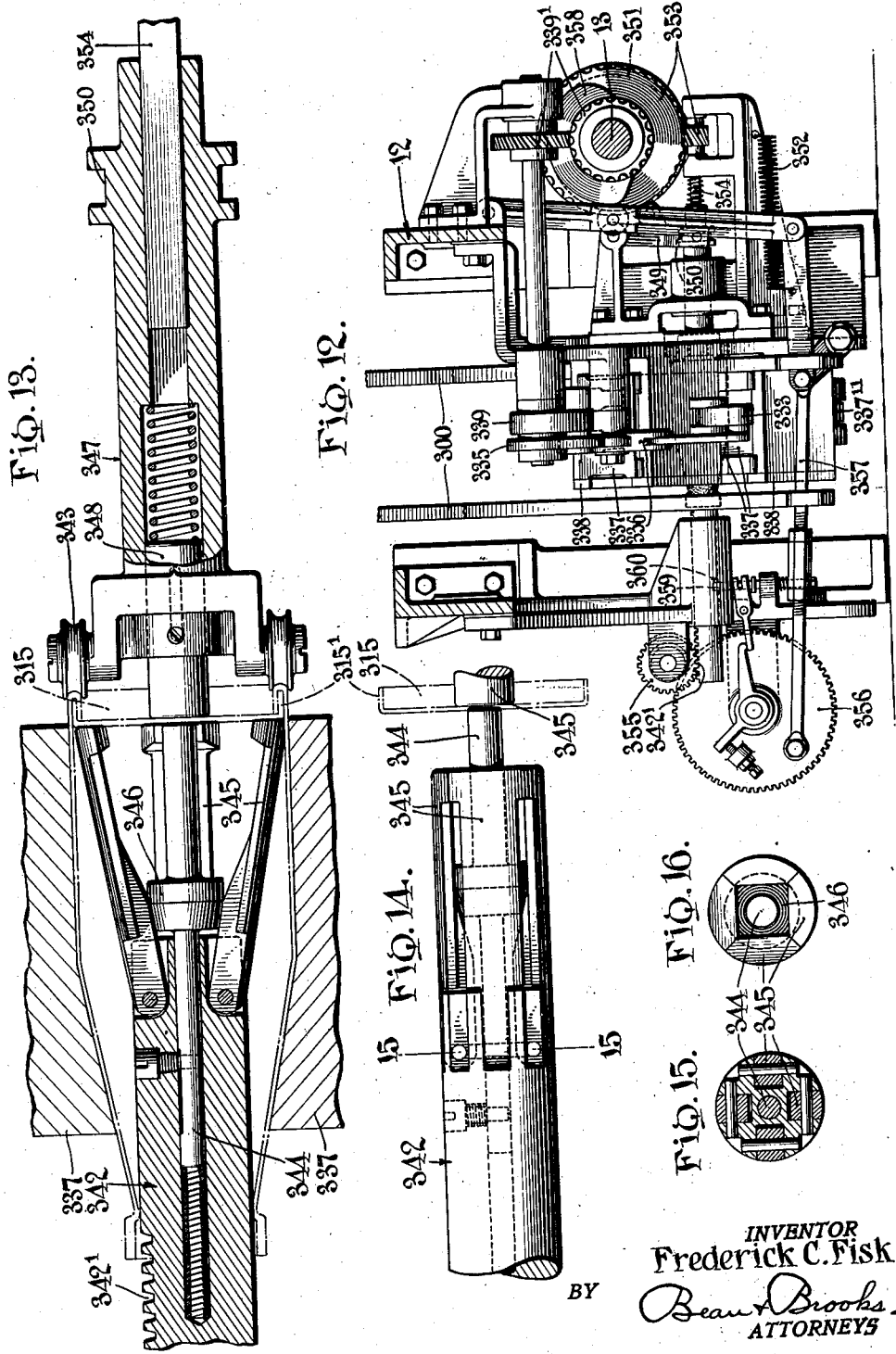

Aug. 4, 1936.   F. C. FISK   2,049,952
MACHINE AND METHOD FOR MANUFACTURING CONTAINERS
Filed Aug. 9, 1933   11 Sheets-Sheet 9
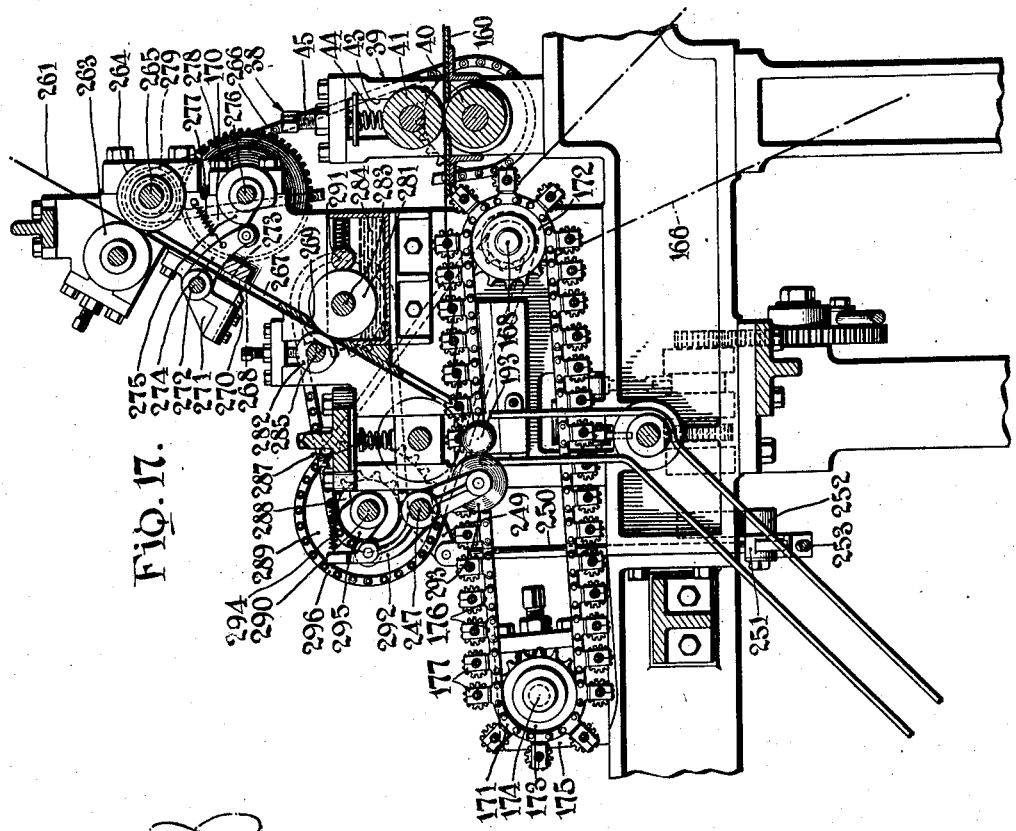
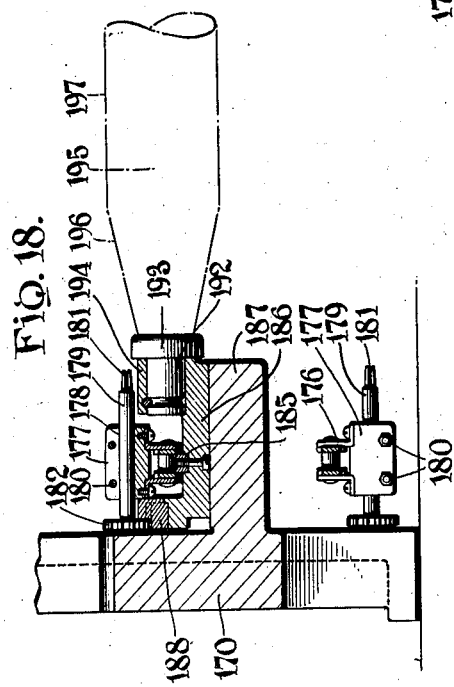
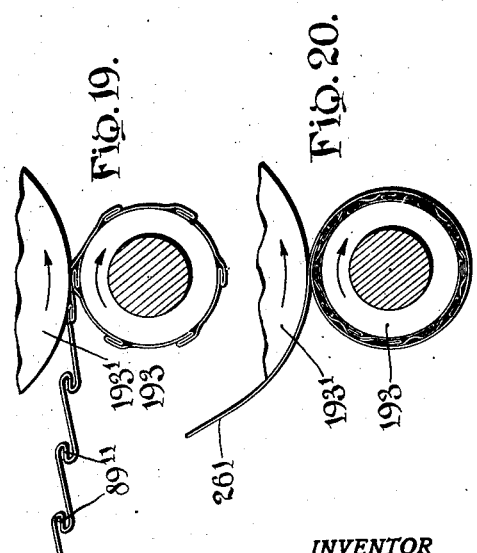
INVENTOR
Frederick C. Fisk,
BY
ATTORNEYS Aug. 4, 1936.  F. C. FISK  2,049,952
MACHINE AND METHOD FOR MANUFACTURING CONTAINERS
Filed Aug. 9, 1933  11 Sheets-Sheet 10
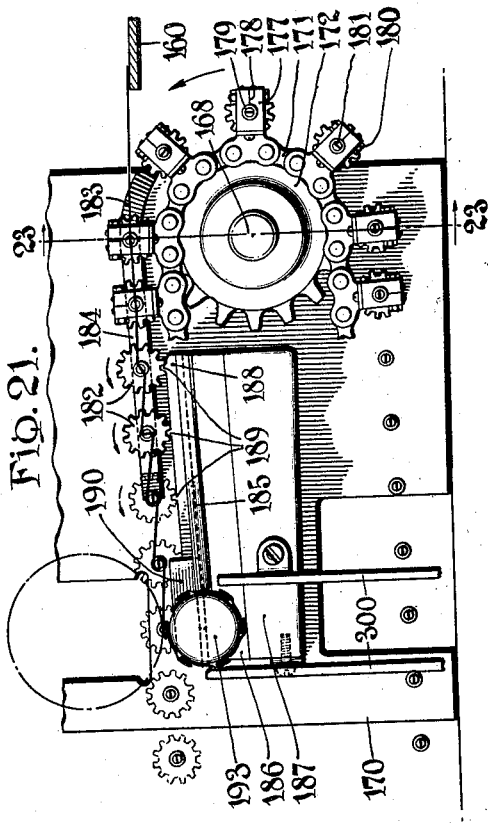
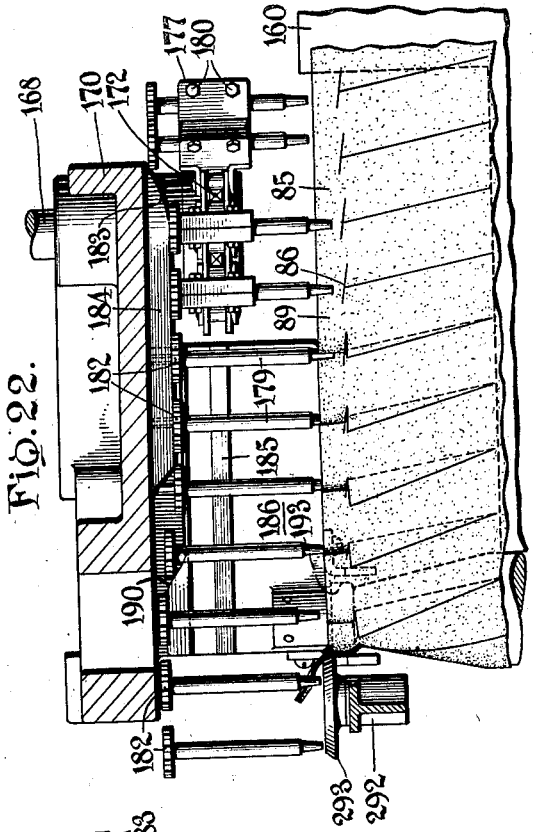
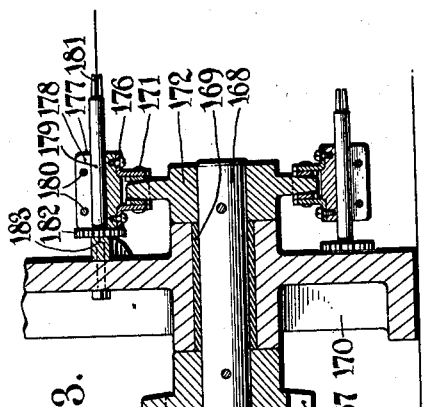
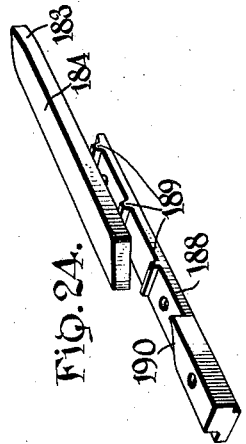
INVENTOR
Frederick C. Fisk.
BY
Bean Brooks
ATTORNEYS

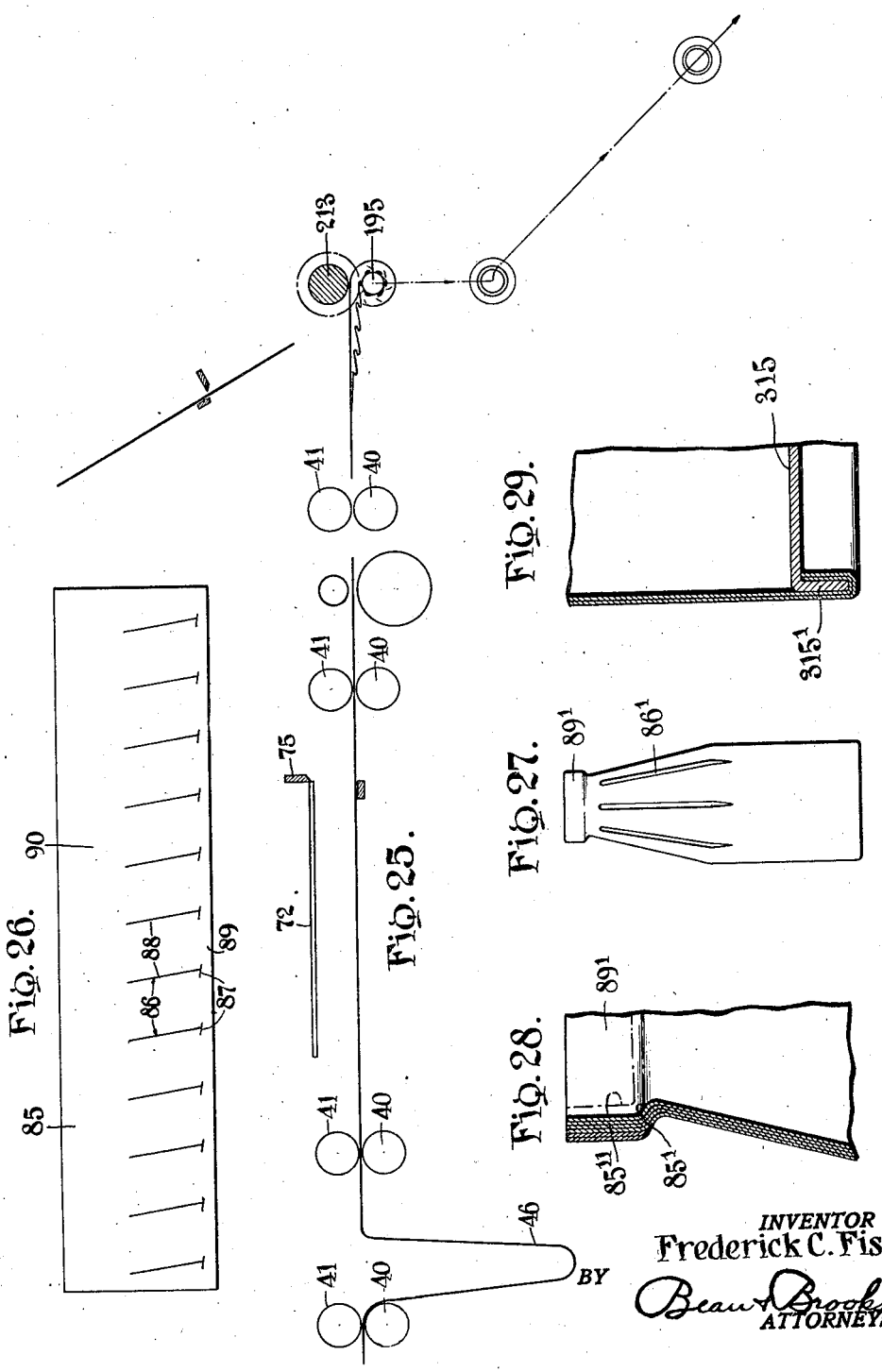

Patented Aug. 4, 1936

2,049,952

UNITED STATES PATENT OFFICE 2,049,952

MACHINE AND METHOD FOR MANUFACTURING CONTAINERS

Frederick C. Fisk, Williamsville, N. Y.

Application August 9, 1933, Serial No. 684,437

12 Claims. (Cl. 93—39)

My invention relates to the art of manufacturing containers for liquids, and it has particular reference to a method and machine for forming bottles from sheet material.

Heretofore machines have been designed to produce bottles from various kinds of materials. The bottles so produced have been objectionable to users because of the inherent structural weaknesses, which require that the maximum of care be used in handling the bottles, while other bottles have been so dissimilar to the older glass bottle that they have not had a ready acceptance by the ultimate consumer.

The manufacturing cost per bottle by one method has been relatively high, due to the body and the neck being formed in separate pieces and the low output of the machine. The necks of the bottles, being tapered, are formed from arcuate pieces which are blanked from a sheet and while the respective pieces are cut as close to the preceding piece as possible, the resultant waste is approximately 25%. The manner of joining the neck stock to the body stock requires that the registering mechanisms for these parts be very accurately adjusted in order to obtain good bottles; however, in operating the machine, the adjustment changes from various causes and poor bottles are the result. When this occurs, the machine must be stopped, readjusted and restarted; therefore it is apparent that the efficiency and output of the machine is lowered.

In other methods, considerable material is required to produce a bottle of sufficient strength to withstand filling, sealing or capping, and handling.

In still other methods, the bottles produced are of such shape and construction that they are not adapted to be filled and sealed or capped by the present filling and capping machines, but require special filling and sealing machines and consequently have not been readily adopted by those persons whose business is filling and sealing bottles.

An object of the present invention is to provide a novel machine and method of forming a bottle or container which is simple and practical and produces a container of a durable nature and one capable of being substituted for the glass containers heretofore used in filling machines.

The invention further has for its object to provide a practical container which is durable and of improved construction.

One embodiment of a machine designed to efficiently produce from strip or sheet material bottles, which simulate the present glass bottle and are adaptable to the present filling and sealing machines, is described herein to illustrate the principles of the invention and includes a press which blanks out a form from the sheet material by providing a series of cuts or slits therethrough and cutting the stock to length at each stroke of the press, mechanisms to imprint upon the strip suitable designation of source, size, etc., where such printing is desired, mechanism to apply an adhesive substance to a portion of one blank or form, mechanism to form the body and neck of the bottle, mechanism to apply a neck reinforcing strip to a portion of the body adjacent the neck to reinforce the same, mechanisms to insert the bottom of the bottle and secure the same in place, and apparatus to coat the exterior of the bottles with a suitable waterproofing substance.

Various other aspects and advantages of the invention will become apparent from a perusal of the following detailed description thereof, wherein reference is made to the accompanying drawings in which:

Fig. 1 is a side elevational view of the operator's side of the machine.

Fig. 2 is an enlarged cross-sectional view taken along line 2—2 of Fig. 1 showing the die arrangement and the inking mechanism.

Fig. 3 is a bottom plan view of a portion of the inking mechanism.

Fig. 4 is an enlarged plan view of the pressure plate for the dies.

Fig. 5 is a bottom side perspective view of a pair of the dies.

Fig. 6 is an enlarged fragmentary elevational view of the inking and gluing mechanisms taken from the drive side of the machine.

Fig. 7 is an enlarged cross-sectional view taken along line 7—7 of Fig. 1 showing a portion of the bottle forming mechanism and other related parts.

Fig. 8 is a sectional view taken along line 8—8 of Fig. 7, showing the driving means for the mechanism which forms the bottle. (Figs. 6 and 8 when read together, show substantially all of the drive side of the machine.)

Fig. 9 is another view of part of the driving means for the body forming and removing mechanisms.

Fig. 10 is a longitudinal sectional view taken along line 10—10 of Fig. 7 showing the body-forming arbor, the bottom-inserting arbor, the bottom-finishing arbor, and other related mechanisms.

Fig. 11 is an enlarged cross-sectional view taken along line 11—11 of Fig. 1, showing particularly the body-forming and trimming mechanism in elevation.

Fig. 12 is an enlarged cross-sectional view taken along line 12—12 of Fig. 1, showing the bottom-finishing arbor.

Fig. 13 is an enlarged fragmentary sectional view with parts in elevation showing the expanding member of the bottom-finishing arbor expanded, the bottle being shown in broken lines.

Fig. 14 is an enlarged fragmentary elevational view of the expanding member contracted.

Fig. 15 is a cross-sectional view taken on line 15—15 of Fig. 14.

Fig. 16 is an end elevational view of the expanding member.

Fig. 17 is a fragmentary sectional view taken on line 17—17 of Fig. 7, showing the neck-forming and reinforcing and neck trimming mechanisms.

Fig. 18 is an enlarged cross-sectional view of the mouth forming portion or head of the two part forming mandrel.

Fig. 19 is an enlarged diagrammatic view showing one method of forming the neck of the bottle.

Fig. 20 is an enlarged diagrammatic view showing one method of applying the reinforcing strip to the neck of the bottle.

Fig. 21 is an enlarged fragmentary elevational view of the neck-forming mechanism with parts broken away.

Fig. 22 is a plan view of the mechanism shown in Fig. 21.

Fig. 23 is a cross-sectional view taken along line 23—23 of Fig. 21.

Fig. 24 is a perspective view of the cam bars illustrated in Figs. 17, 18, 20, 21 and 22.

Fig. 25 is a diagrammatic view showing the several steps in the formation of the bottles and the path of the strip materials from which the bottle is formed.

Fig. 26 is a plan view of a blanked body strip.

Fig. 27 is an elevational view of a complete bottle.

Fig. 28 is an enlarged fragmentary view of the neck of the bottle showing one method of reinforcing the same.

Fig. 29 is an enlarged fragmentary view of the bottom of the bottle showing the method of securing the bottom therein.

Briefly, the several steps followed in the production of containers, in accordance with the present disclosure, comprise first the blanking operation by which a container blank is cut out ready for being shaped; second, the application of an adhesive to the container blank, making it ready for presentation to a shaping mechanism; third, the shaping or forming operation wherein the prepared blank is wound about a forming mandrel subsequent to a preliminary manipulation of the blank necessary for producing a contraction or reduced diameter in a portion of the container; fourth, the application of a reinforcement to a portion of the container either simultaneously with the shaping thereof or immediately following such formation; fifth, applying an end closure to the shaped container; and finally, where such is desired, water-proofing the container.

*Driving mechanism*

The bed or frame of the machine shown is substantially rectangular in plan and is formed of several parts comprising a stock supporting frame 11 secured to the forward end of a main frame 12. A main drive shaft 13, from which all of the various mechanisms to be hereinafter described are driven, is journaled for rotation in shaft hangers 14 at the rear side of the machine. As best viewed in Figs. 2, 7, 11 and 12, the shaft 13 is rotatable in a clockwise direction and may be driven constantly from any suitable source of power (not shown).

Mounted above the main shaft is a rotatable stub shaft 15 (Fig. 6) which is journaled in a pair of shaft hangers 16 and a similar hanger 17. A small spur gear 18 is mounted on and pinned to shaft 15 adjacent the forward end thereof for rotation therewith, and is intermittently driven by a large mutilated spur gear 19 fixed to shaft 13. The diameter of the large gear 19 is twice that of the small gear 18 and has the same number of teeth on one-half its face as the entire small gear, so that it will drive the small gear through a complete revolution during one-half its cycle, (see Fig. 2) then disengage so that the small gear remains stationary while the larger gear is completing its cycle, whereby upon continuous rotation of the shaft 13 the shaft 15 is intermittently driven. Referring particularly to Fig. 6, the intermittently driven shaft 15 has secured thereon a plurality of bevel gears 20, each of which intermeshes with and drives its respective bevel gear 21. Gears 21 are secured to the lower ends of vertical shafts 22 journaled in shaft hangers 23. The forward end of main drive shaft 13 is provided with a bevel gear 24 which intermeshes with and constantly drives a bevel gear 25 secured to the lower end of a vertical shaft 26 in frame 11. The upper ends of shafts 22 and 26 are provided with bevel gears 27, which intermesh with and drive half-size bevel gears 28 forming a part of the body stock feeding mechanisms which will be hereinafter described in detail.

*Stock supplying and feeding mechanisms*

A roll of body stock or strip material 30 is mounted upon a spindle or shaft 31 which is journaled in supporting brackets 32 of the extension frame 11. Brackets 32 are formed to permit ready positioning of a roll of stock thereupon and ready removal of the spool when the stock is depleted.

In order to apprise the operator when the supply of stock is low an electric signal device 33 is mounted on the frame 11 adjacent the roll 30 and is provided with an arm 34 which has rolling contact with the periphery of the roll by gravity so that when the roll has diminished to a predetermined size, the arm 34 will actuate a switch mechanism (not shown) of the signal device and close an electrical circuit, thereby causing the operator to be signaled, or the machine to be stopped until the supply is renewed.

The body stock is successively fed through a plurality of spaced feeding devices 35, 36, 37 and 38 all of which are substantially alike, so that only one of said devices need be described. Each feeding device comprises a pair of spaced brackets 39 secured to the main frame, a flanged guide and driving roller 40 having its ends reduced and journaled for rotation in the brackets, a pressure roller 41 having reduced ends journaled in blocks 42 slidably mounted in slideways 43 formed in the brackets, springs 44 for applying pressure to the blocks, and screws 45 for compressing the springs, whereby the pressure obtained by compressing the springs is transmitted through the blocks to the presure roller to maintain the stock on the driving roller 40. One reduced end of roller 40 is extended beyond the bracket to have fixed thereon one of the bevel gears 28 above referred to.

When the machine is in operation, stock is constantly withdrawn from the roll by the feeding device 35, which latter is driven at a constant rate of speed from the continuously rotating main shaft through gears 24 and 25, shaft 26, and gears 27 and 28. A loop 46 is provided in the stock strip between the feeding devices 35 and 36 as a safety factor to prevent the stock from breaking when the feeding devices 36, 37 and 38 are operating. Devices 36, 37 and 38 being intermittently driven at a greater rate of speed than device 35 from the intermittently driven shaft 15 (through gears 20 and 21, shafts 22, and gears 27 and 28) draw the stock from the safety loop rather than from the roll directly, thereby preventing the possibility of breaking the stock or spinning the roll.

*Blanking mechanism*

Mounted upon the main frame 12 between the feeding devices 36 and 37 there is a reciprocatory blanking press 50, comprising generally a press frame 51, a die plate 52, a reciprocatory platen 53, a single-throw crank shaft 54, a connecting rod 55 between the platen and the crank shaft, a friction braking device 56 on the rear end of the crank shaft, and a one-revolution clutch mechanism generally indicated at 57, flywheel 58 and pulley wheel 59 mounted on the forward end of the crank shaft. When the machine is in operation, the flywheel 58 and pulley wheel 59 being secured to each other and mounted for free rotation on the forward end of the crank shaft are constantly driven, as by a belt 60 trained around the pulley wheel 59 and a pulley wheel 61 secured to the main shaft. The one-revolution clutch 57 is not specifically shown but may be of any approved form and designed to be tripped as by depressing a treadle 62 to which a rod 63, leading to the clutch, is connected.

The strip stock is fed across the face of the die-plate by the feeding devices 36 and 37 and, being maintained thereon against lateral and vertical displacement by the flanges 64 of guide plates 65 (see Fig. 2), is blanked in the following manner where the press is tripped as above described.

A plurality of dies 66 each having cutting edges 67, 68 and a plurality of complementary dies 69 each having a cutting edge 70 are angularly secured to the lower face of platen 53 as by machine screws. A pressure plate 72 is resiliently mounted to the lower face of the platen and is formed with angular slots 73 and 74 through which the dies 66 and 69 may pass. A transverse stock cut-off die 75 of greater length than the width of the stock and having a cutting edge 76, is secured to the end of the platen beyond the pressure plate.

The die-plate 52 is formed with angularly disposed die openings 77 each having cutting edges 78 and 79 vertically aligned with the cutting edges 67 and 68, angularly disposed die openings 80, having cutting edges 81 vertically aligned with the cutting edges 70, and a transverse die opening 82 having a cutting edge 83 vertically aligned with the cutting edge 76.

The dies 66 and 69, arranged in spaced pairs on the platen 53, are angularly disposed with respect to each other and to the adjacent edge of the platen, so that the cutting edges 67, 68 and 70 form a plurality of spaced inverted T-shaped cutting edges in which the stems formed by the cutting edges 67 and the heads formed by the adjoining cutting edges 68 and 70 are angularly disposed to each other and to the aforesaid edge of the plate.

When the press is tripped the platen descends, initially positioning the pressure plate upon the stock to firmly hold the same, and then the cutting edges 67, 68, 70 and 76 coact with the vertically aligned cutting edges 78, 79, 81 and 83 to form a plurality of spaced T-shaped slits or cuts in the stock and squaring its forward end, as shown in Fig. 26. The platen now ascends from this pre-formed portion of the stock, the latter is advanced by the feeding devices 36 and 37 to present a new portion and then, upon the subsequent downward movement of the platen, the pre-formed portion is cut off and the succeeding new portion of the stock is blanked by the coacting cutting edges of the die elements.

In cutting off the pre-formed portion of the stock, a rectangular blank 85 having spaced T shaped slits or cuts 86 therethrough is formed (Fig. 26). The heads 87 of the T shaped cuts 86 are angularly disposed to the stems 88 thereof and relative to the adjacent edge of the blank, from which edge the heads are spaced to provide a narrow marginal portion 89. The ends of stems 88 opposite the heads 87 terminate inwardly of the opposite edge of the blank to provide a wide marginal portion 90 from which the main body portion of the container is formed.

*Inking mechanism*

The lower face of the pressure plate 72 beyond the slots 73 and 74 is provided with printing or embossing characters 92 which when prepared and pressed against the blank 85 imprint thereon suitable designations or markings as to source, quality, volume, and so forth.

The characters 92 are prepared for printing as by an inking mechanism 93 which transfers the printing medium or ink from the face of an inking disc 94 to characters 92 by means of a pair of movable inking rollers 95. In order to insure proper inking of rollers 95 during movement thereof, disc 94 is rotatable, being mounted by a central stud 97 thereon to a support 98, adjustably secured to the press frame as by machine screws 99. A ratchet wheel 100 is secured to the lower face of disc 94 and is operated by a spring pressed pawl 101 pivotally mounted on a lever 102 intermediate its ends. one end of the lever being rotatably mounted on the stud to permit movement about the axis of the stud, whereby during movement of the lever in one direction of movement the pawl engages the ratchet wheel and partially rotates the disc to present a fresh inking surface to the inking rollers.

The free end of lever 102 is pivotally connected to one end of a link 103, the other end of the link being pivotally connected to and movable by a movable frame or carriage 104 having pivotally connected thereto a pair of L shaped arms 105 on the long reach of which the rollers 95 are journaled for rotation. The short reach of each arm 105 bears against a spring 106 carried by a lug 107 on carriage 104 so that the rollers 95 are resiliently supported and may deflect slightly when they are brought into contact with the characters 92 insuring proper inking of the characters. The carriage 104 is formed with opposed spaced pairs of upstanding lugs or arms 108 through the terminals of which cross rods 109 are extended to receive small flanged wheels 110; the carriage being movably supported on and guided by parallel spaced track members or rails 111 and 112 upon the former of which the wheels roll while the latter prevent tipping of the frame. The rails are supported from the frame 51 by a supporting bracket 113. The rear end of carriage 104 is formed with depending guideways 114 in which rollers 115 are positioned, the rollers being mounted on the upper ends of levers 116 which are secured to a rotatable stub shaft 117 journaled in shaft hanger 17. Secured to a rotatable sleeve 118 journaled in shaft hanger 17 and on shaft 15 are a pair of levers 120 and 121 each having secured to its upper end a stud pin 122 which engages in a slot 123 formed in each lever 116. The lever 121 is extended below its fulcrum point to form a cam plate 124 which is urged into contact with a cam 125 on drive shaft 13 by means of a tension spring 126. The cam 125 acts to rock the levers 120 and 121 inwardly and, through the stud pins 122, moves the levers 116 to shift the carriage 104 inwardly. As the carriage moves inwardly the inking rollers contact with and apply ink to the printing characters 92. A further rotation of cam 125 permits the parts to resume their normal position (Fig. 2) under the impetus given by the spring 126.

Gluing mechanism

Between the feeding devices 37 and 38 there is a gluing mechanism 130 having a trough or glue pot 131 mounted transversely on the frame 12. A transverse shaft 132 journaled for rotation in the ends of the glue pot has secured to its medial portion a gluing drum 133, which is partially submerged in a liquid adhesive in the glue pot, so that upon rotation of the drum a film of glue is applied to its gluing surface. A roller 134, slidably mounted in guideways formed in the end of the glue pot 131, is pressed against the surface of the drum as by springs 135, thereby regulating the thickness of the glue film on the gluing side of the drum. Drum 133 is constantly rotated as by a sprocket chain 136 trained around a small sprocket wheel 137 on shaft 132 and a large sprocket wheel 138 on a transverse shaft 139. Shaft 139 is provided with a bevel gear 140 which intermeshes with and is constantly driven by a bevel gear 141 on the drive shaft 13. A pressure roller 142 is journaled in blocks 143 which are slidably mounted in guideways 144. The ends of shaft 145 are also journaled in blocks 146 which are slidably mounted in vertically movable yoke members 147. Compression springs 148 urge the blocks 143 toward the bottoms of the yokes 147, and provide a resilient or yieldable connection therebetween. Adjustable rods 149 pivotally connect the yokes to the free ends of levers 150, the other end of the levers being secured to a transverse rock shaft 151 which is journaled on the frame 12 and has a lever arm 152 with a bifurcated offset portion 153 carrying a small roller 154. The roller 154 rides upon a cam 155 secured to shaft 13 and as the cam rotates with the shaft the arm 152 is moved upwardly thereby rocking shaft 151 so that levers 150 exert a downward force on connecting rods 149 and on the roller 142.

In order to support a blank 85 as it leaves the press, a large supporting plate 160 is mounted above drum 133. Feeding devices 37 and 38 are adapted to operate through openings 161 and 162 respectively, in plate 160. A similar opening 163 is formed in the plate above drum 133 and permits roller 142 during its above described downward movement to press the blank 85 into resilient contact with the gluing drum thereby applying a thin film of glue to the blank. Since it is not desirable to apply glue to the whole blank, the gluing mechanism is operated as above described after approximately one-half of the blank has been fed across the gluing mechanism.

Forming mechanisms

The end of shaft 139 opposite the gear 140 is provided with a large sprocket wheel 165 which by means of a sprocket chain 166 drives a smaller sprocket wheel 167 secured on a transverse stub shaft 168 of a part of a pre-forming mechanism. Shaft 168 is rotatably mounted in a bearing 169, (Fig. 23) formed in a superstructure 170 on the frame 12 rearwardly of feeding device 38.

A sprocket chain 171 is trained around a pair of sprocket wheels 172 and 173, the former being secured to the inner end of shaft 168 and the latter being rotatably mounted on a stud 174, adjustably mounted in a bracket 175 on frame 12 (Fig. 17) so that chain 171 may be adjusted. The axis of stud 174 lies in a plane lower than the axis of shaft 168 so that the reaches of chain 171 travels at a slight angle to the plane of plate 160 for a purpose to be hereinafter described. Every other pair of links of chain 171 is formed with outturned ears 176 (Fig. 23) upon which blocks 177 are transversely mounted. Each block 177 is provided with a split bearing 178 in which a rod or pin 179 is journaled, the latter being held frictionally against free rotation by screws 180 arranged transversely across the split. By adjusting the screws a predetermined friction load may be placed upon the rod or pin 179 which is mounted in bearing 178 for both rotary and axial movements. The inner end of each pin is provided with a slot 181, while the outer end thereof is provided with a small gear 182 normally spaced from its block 177.

The direction of rotation of shaft 168 is such that the upper reach of chain 171 travels rearwardly and in doing so the gears 182 successively engage the cam surface 183 of a bar 184 secured to frame 170 (Fig. 22).

Each gear 182 upon engaging cam surface 183 is moved inwardly from its normal position of travel to a position adjacent its respective block 177, during which movement pin 179 is moved inwardly until the slot 181 is aligned with and engages the marginal edge 89 of the moving blank 85 adjacent a T-shaped cut 86. The upper reach of chain 171 is supported intermediate sprocket wheels 172 and 173 upon a guide member or track 185 which engages between the links of the chain and prevents lateral displacement thereof (Fig. 18). Track 185 is secured in a groove formed in a plate 186 which is rigidly mounted on the inclined face of a block 187 formed on the inner face of frame 170. A rack bar 188 having widely spaced transverse teeth 189 and a cam surface 190 is mounted on an elevated portion of plate 186 so that teeth 189 and cam surface 190 lie in the path of gears 182.

Movement of chain 171 causes each gear 182 to successively engage teeth 189 so that the friction load on pins 179 is momentarily overcome and they are partially rotated upon each aforesaid engagement. The sum total of the partial rotations of each gear and pin is such that each slot 181 rotates through approximately 180° thereby overlapping portions of the margin 89, adjacent each T-shaped cut 86, so as to shorten the length of the blank along that margin. This effective shortening of this margin of the blank forms a reduced neck formation when the blank is wound about its mandrel now to be described. Upon further movement of chain 171 disengagement between each pin and the pre-formed blank is obtained by the gears successively engaging cam surface 190 which withdraws the pins from the blank and returns the gears to their normal position of travel where they remain until they again engage cam surface 183.

A transverse stud 192 having an enlarged mouth-forming head 193 is rotatably mounted in a bearing 194 on the inner rear side of plate 186 in coaxial alignment with a transverse shaft 195 of a forming mechanism (Fig. 7). The inner end of this shaft 195 is formed with a frustro-conical or tapered neck-forming portion 196 tapering from a body-forming portion 197 and grooved as at 198. The free end of shaft 195 normally abuts head 193 and both parts conjointly form a separable, two-part forming mandrel or roller about which is shaped a container body having a tapered neck and a mouth. Either or both parts of the mandrel are axially shiftable. According to the present disclosure the shaft 195 is both rotatably and slidably mounted in a long transverse bearing 199 of frame 12, and has a slidably splined or keyed connection with the hub of a helical gear 200 which latter is interposed between spaced brackets 201 on the frame. A helical gear 202 meshes with gear 200 (Fig. 8) and is formed with an extended hub 203 and a reduced terminal 204. The hub 203 constitutes a hollow shaft and is rotatably mounted in the frame 12. A small sprocket wheel 205 which is secured to terminal 204 and a large sprocket wheel 206, secured on main shaft 13, are operably connected by a sprocket chain 207 so that gears 202 and 200 and shaft 195 are constantly driven by main drive shaft 13.

Mounted above the shaft 195 is a shaft 208 which is journaled in blocks 209 that slide in guideways 210 of frame 170. Compression springs 211 urge the blocks 209 downwardly in their guideways, being adjustably compressed as by screws 212. A pressure roller 213, formed with a body portion 197', a tapered portion 196' having ribs 198', and a mouth-forming portion 193' complementary to the correspondingly numbered parts (not primed) of the two-part former or mandrel, is secured to shaft 208 so that the complementary portions coact under the resilient pressure of springs 211. A gear 214, being slidably keyed on shaft 208, intermeshes with and is driven by a long gear portion 215 formed intermediate the ends of shaft 195, so that the latter constantly drives shaft 208 at the same rate of speed and throughout its sliding movement. Disengagement of gear 214 with gear portion 215 during sliding movement of shaft 195 is prevented by a collar 216 secured on shaft 195.

The pressure roller 213 is shiftable axially with its shaft 208 as the forming mandrel is withdrawn from the rolled container so as to facilitate the discharge of the container. This shifting movement of the pressure roller is effected by spring means pressing in an axial direction. (Such spring means are not specifically shown herein but may be embodied within the pressure roller between the latter and a non-shiftable part thereof.) The return movement may be effected by the gear 214 abutting the inner end of its sliding key connection with the shaft 208. This action will withdraw the container from the mouth-forming head 193 so that when the container is arrested by the shoulder of the shaft bearing 199, during the withdrawal or axial movement of the forming mandrel, the container will be free to drop for subsequent manipulation.

Sliding movement of shaft 195 is effected in the following manner. To the outer end of the shaft is swiveled a rack bar 217, being coaxially connected thereto by a screw plug 218 which has a central bore to receive the reduced end 219 of a rack bar. A thrust bearing 220 is mounted on reduced end 219 so that shaft 195 may rotate freely about such reduced end. The outer end of rack bar 217 is slidably mounted in a frame bracket 221 with the teeth thereof intermeshed with a gear 222 secured on a stub shaft 223 which is transversely mounted for rotation in the bracket. One end of shaft 223 extends beyond bracket 221 and is provided with a gear 224 which intermeshes with a gear segment or arcuate rack 225 secured on the end of a stub shaft 226, transversely mounted for rotation on the frame 12. The lower end of a lever arm 227 is journaled on a pin 228 on the frame below stub shaft 226. The upper end of this lever is formed with a slotted portion 229 which engages a pin 230 secured on gear segment 225. A heavy tension spring 231 urges the lever 227 against the adjacent end of a slide bar 232, the latter being slidably mounted in block 233 and has its opposite end acted upon by a cam 234 on shaft 235. This shaft is journaled in hub 204 of gear 202, and also in the frame, and is provided with a sprocket wheel 236 which is connected by a sprocket chain 237 to a sprocket wheel 238 secured on shaft 13, so that said shaft 235 is constantly driven thereby (see Figs. 8 and 9). Cam 234 acts to slide bar 232 outwardly against the tension of spring 231 and thereby moves lever 227 outwardly to partially rotate gear segment 225 and, through gear 224, shaft 223, gear 222 and rack bar 217, withdraw shaft 195 from head 193. This action separates the component parts of the forming mandrel. Upon a complete revolution of cam 249 spring 231 returns the parts to their original or assembled positions.

The angle at which chain 171 travels and the location of pins 179 thereon is such that after engaging the moving blank, they gradually preform and bend the marginal portion thereof downwardly towards the composite mandrel so that when the blank is fed between said composite mandrel and roller 213, the pre-formed, overlapped marginal portion of the blank will shorten or contract for the formation of the smaller diameter of the container about the head 193 and tapered portion 196. The blank is guided around shaft 195 by a pair of fixed arcuate guide plates 241 (Fig. 10) and a movable arcuate guide plate 242 which latter is pivotally mounted, as by pin 243, on a bracket 244. A link 245 is pivotally connected to plate 242 and to a rocker arm 246 on transverse shaft 247. This shaft is extended beyond frame 170 and provided with a lever 249 connected by a vertical connecting rod 250 to one end of a bell crank 251 pivotally mounted on a bracket 252. The opposite end of bell crank 251 is connected by a transverse connecting rod 253 to the lower bifurcated end of a lever 254 having its upper end pivotally mounted in a bracket 255. The bifurcated end of lever 254 may be provided with a roller 256 and is held in contact with a cam 257 on shaft 13 by a spring 253'.

As shaft 13 revolves a high portion or lobe on cam 257 acts on lever 254 to move it inwardly whereby, through the linkage above described, guide plate 242 is rotated about pin 243 away from guide plate 241 and shaft 195 for a purpose and at a time to be presently described.

In the present application of the principles of this invention, the blank 85 is slightly longer than twice the circumference of shaft 195 and is adapted to be formed as above described into a two-ply container body having a tapered neck and a mouth. Should it be found desirable to increase the number of plies, the blank would be increased a length slightly more than equal to the circumference of shaft 195 for each additional ply.

Reinforcement applying mechanism

Rotatably mounted upon frame 51 in a bracket 260 is a roll of narrow strip material 261 utilized herein to reinforce and stiffen the mouth of the container. This supply of stock material may also be provided with signaling apparatus, generally indicated at 262, to indicate when the supply of stock is nearly exhausted and thereby apprise the operator of the fact or to stop the machine. Any approved signaling apparatus may be employed and therefore the details of the same are not shown.

The strip material 261 is withdrawn from its roll and passes between a pair of feed rollers 263 and 264 journaled in the frame 170, the roller 263 being adjustably mounted while roller 264 is fixed on a shaft 265 which is driven through sprocket and chain connection 266 to the shaft of roller 40 of the feeding device 38. Rollers 263 and 264 feed the strip material 261 downwardly over the face of an inclined guide plate 267 and across a pair of spaced openings 268 and 269 formed therein. A knife 270 is adjustably secured in an arm 271 on a shaft 272 and is adapted to operate through opening 268 and cooperate with an edge or block 273 for severing the desired length of the reinforcing strip for each container. A rocker arm 274 is secured to shaft 272 and is acted upon by a cam 275 of shaft 276 to remove the knife 270 from its block. A spring 277 actuates the knife on its cutting stroke as the shaft continues to rotate. The outer end of shaft 276 is provided with a gear 278 driven by a half-size gear 279 on shaft 265.

In passing over opening 269 glue is applied to the strip material 261 by a driven gluing roller 281 against which it is pressed by a pressure roller 282, the former being secured on a transverse shaft 283 mounted to rotate in a glue container or pot 284 partially filled with an adhesive substance or glue. Pressure roller 282 is secured on a transverse shaft 285 and is urged towards the glue applying roller 281 by a pair of adjustable screws 286, so that rotation of rollers 281 and 282 feeds the strip material therebetween and roller 281 applies a film of glue thereto. Shaft 283 is driven by a chain and sprocket connection 287 from the smaller of a pair of sprocket wheels 288 and 289 on the outer end of a transverse stub shaft 290. A spreading roller 291 regulates the film of glue to be applied by roller 281.

Rollers 263, 264, 281 and 282 conjointly feed the strip material 261 until the knife is operated to cut the required length therefrom, after which the rollers 281 and 282 carry the severed section to the forming mandrel where it is applied to the reduced or contracted mouth of the container body to reinforce the same. Should it be found desirable or advantageous, the forepart of this reinforcing strip could be applied to the mouth of the container body between the plies thereof and the after-part of the strip formed around the mouth as before by simply advancing the time at which the strip is applied thereto.

A lever 292 rotatably carries a trimming wheel 293 on its lower end, and said lever being pivoted intermediate its ends on shaft 247 and having its upper end urged by a tension spring 294 in riding contact with a cam 295 on shaft 290. Rotation of shaft 290 and its cam 295 rocks lever 292 about the axis of shaft 247 so that trimming wheel 293 engages head 193 and thereby trims the mouth of the container body (Fig. 22). Shaft 290 is constantly driven from shaft 168 by a sprocket and chain connection 296.

Bottom applying

Immediately upon the functioning of the trimming mechanism the forming mandrel is withdrawn from the formed body and this is followed by removing the guide plate 242 from beneath the container so that the latter is free to drop down the chute 300 to the bottom inserting station. In its movement through the chute the bottle is arrested by a pair of holding jaws 301 and 302 the former jaw being fixed to the frame and the companion jaw being hinged to the fixed jaw by hinge pin 303 (Fig. 7). Cooperating with the jaws of this holder is a pair of slidable gate members 304 and 305 (Figs. 10 and 11) which come together immediately above the container so as to clamp the same in the holder during the bottom inserting operation. Withdrawal movement of the clamping gate member 305 is effected through the rack and pinion movement 306, the pinion being oscillated in timed relation from the cam 307 on shaft 13 through the linkage 308. Similar movement is imparted to the gate member 304 by means of the bell crank lever 309 which is oscillated by a cam 310 on shaft 311. This shaft is driven from a cam 312 on the main shaft 13 through leverage 313 and gearing 314.

With the container clamped within the holder by reason of the gate members the disc-like bottom piece 315 is introduced into the larger end of the container. These bottom pieces are supplied from a hopper tube 316 (Fig. 7) and across the delivery end of this tube is movable an ejector slide 317 designed to take one of the bottom pieces and present it to a shaping die 318 through which it is now forced by a cooperating plunger 319 into the adjacent end of the container. The die 318 turns the marginal portion of the bottom piece into a flange 315' which snugly fits against the inner periphery of the container. Such disposition of the bottom piece is shown in Figs. 7 and 29. The positioning of the bottom piece within the container is aided by a depth gage member 320 which is inserted through the rack of the container substantially simultaneously with the action of the plunger 319. This gage member is projected and retracted through the rack and pinion drive 321, the pinion being mounted on a shaft 322 which also carries a cam 323. This cam rocks a lever 324 for moving a latch 325 into and out of latching relation with the depth gage. The latch is normally urged retracted by a spring 326 to keep the opposite end of the lever in cam engaging position. When the gage member reaches its innermost position the latch 325 enters a notch 327 so as to hold it against backward movement during the introduction of the bottom piece in the opposite end of the container. Shaft 322 is driven from the gear 328, the latter being oscillated by the pitman 329 that is connected to a lever 330 acted upon by a cam 331 on shaft 13.

After the introduction of the bottom piece into the container the plunger 319 is removed and likewise gage member 320, and then the gate members 304 and 305 are withdrawn through the oscillation of the gearing 314 which oscillation is further utilized to open jaw 302 through the gear 332 that is fixed to the hinge pin 303 and operatively connected to the gearing 314. The opening movement of this jaw member 302 is sufficient to release the container for rolling further down the chute 300 until it is again arrested at the bottom finishing station by the stop member 333. This stop member is pivoted at 334 and is oscillated into and out of the path of the container by a cam 335 acting through the linkage 336. When arrested at this station the container is again clamped by a pair of cooperating jaws 337. The jaws are mounted for sliding movement in the guides 338 and are adapted to be brought into cooperative relation by the cams 339 and 340 which act respectively on the jaw actuating levers 337' and 337''. The cams may be driven from the main shaft 13 through gearing 339' and 340', respectively.

The jaws 337 clampingly embrace the container and support the same with the bottom edge portion projecting so as to be rolled over the flange 315' of the bottom piece, as shown by the broken line in Fig. 13. For this operation an expanding arbor 342 is introduced within the container through the neck end thereof to cooperate with the crimping rollers 343 which act exteriorly on the bottom edge of the container. The arbor is provided with a resiliently supported plunger 344 to yieldably engage the bottom piece 315 and is also provided with expansible anvil members 345 which are pivotally mounted and adapted to be spread outwardly by a spreading cam 346 on the plunger 344. The crimping rollers 343 are carried on a crimper 347 which is also provided with a yieldably projected plunger 348 in substantially axial alignment with the plunger 344 to coact therewith in centrally engaging the bottom piece 315.

The crimper 347, in addition to being rotatable, is also moved axially. As the crimper 347 and the arbor 342 are brought together through axial movements the two plungers 344 and 348 will engage the bottom piece and support the same while the crimper and arbor continue their advance toward each other. This continued movement causes the cam 346 to spread the anvil members 345 into engagement with the bottom piece at its margin which is now being engaged and acted upon by the crimping rollers 343. Consequently the free portion of the body of the container will be turned over the flange 315' and secure the bottom piece in position (Fig. 29).

Immediately upon the securement or crimping of the bottom within the container the arbor 342 is removed from the latter and the crimping rollers 343 are likewise retracted. Retraction of the crimping head 347 is effected through the lever 349 which has a yoke terminal engaging in the groove 350 and is moved back and forth by a cam 351 with the aid of a spring 352. The crimping head is rotated from shaft 13 through the gearing 353 and a shaft 354 to which latter it is keyed to telescope thereon. The arbor 342 is inserted and retracted by means of the rack and pinion drive, the rack part 342' being formed on the arbor and the pinion part 355 being driven from the oscillatory gearing 356. Oscillatory movement is imparted to this gearing from the shaft 13 by means of linkage 357 and cam 358 the latter being fixed on said shaft. For securing the arbor in its operative position there is provided a latch pin 359 which is normally retracted but is adapted to be engaged in a notch 360 of the arbor 342 to hold the latter firmly during the bottom crimping operation. During this latch pin engagement the gearing 356 is maintained at rest by reason of the high dwell portion on cam 358.

Following the retraction of the arbor and crimper the container is then delivered by the chute 300 to a conveyor mechanism 361 which transfers them to a water-proofing chamber 362 and delivers them to be acted upon by sprays of water-proofing substance, such as paraffin, delivered by the pipes 363. Following this water-proofing operation the completed containers are then directed through delivery chute 364 which delivers the completed containers to a moving conveyor 365, preferably in an inverted position. To expedite the drying of the water-proofing coating, a heater 366 may be associated with the chute 364.

*The operation*

In operation the blank strip 30 is delivered to the blanking press 50 for the blanking out operation, which consists in primarily forming the slits 86, and also for the severance of the blank from the remainder of the strip supply. Where printing is essential the blank is also impressed as the blanking head of the press descends. Following this blanking operation the blank is fed to the gluing mechanism which is timed to apply adhesive to approximately the latter half of the whole blank, this being the preferable mode so as to avoid any adhesive reaching the forming mandrel by and during the winding of the blank thereabout.

The glued blank is then presented to the forming mechanism and immediately before reaching the forming mandrel the pins 179 engage the marginal portion 89 to pre-shorten such margin by overlapping the marginal parts immediately adjacent the slits 87. This overlapping of the marginal portion also effects an overlapping of the sides of the slits 88 (Fig. 22) so that the blank will accommodate itself to the tapered portion 196 and the mouth forming head 193 of the composite forming mandrel, the unslitted portion of the blank winding about the body forming portion 197. As the blank approaches the mandrel, cam 190 effects a gradual withdrawal of the blank overlapping pins 179, the complete withdrawal being effected immediately before reaching the mandrel and its cooperating roller 213. In this connection it will be noted that the overlapped side portions of the slits 88 are engaged between the mandrel and the cooperating pressure roller prior to the entering of the overlapped marginal portion and thereby further insure the maintenance of the overlapped relationship following the withdrawal of the pins.

During the winding of the blank about the mandrel or immediately thereafter the neck mouth reinforcing strip 261, carrying its own adhesive film, is wound about the mouth part 89' of the container so as to give ample reinforcement to the completed container sufficient to enable the capping or closure of the container by a suitable closure applying machine in commerce. As the blank continues to be wound about the mandrel the adhesive will secure the given shape so that when the mandrel is withdrawn and the movable guide plate 242 is removed the shaped container will drop to the holder jaws 301, 302 for the application of the bottom piece. Following this application the jaw 302 of the holder opens to allow the passage of the container to the bottom crimping station where the container is again engaged by the jaws 337 and the bottom piece is secured within the container by the cooperative action of the arbor 342 and crimper 347.

The completed container is then delivered by the conveyor 361 to the water-proofing chamber 362 so as to have the water-proofing finish applied thereto. After removal from this chamber the container is ready for commercial use.

The container is durable and, in the present disclosure, simulates or has a shape substantially that of the well known glass milk bottle so as to adapt the container to the present bottle capping machinery. The bottle-like container being formed from strip stock may be economically produced and by reason of the plural ply construction of the side walls, the plies of which are adhesively joined, the wall structure of the container is given sufficient strength to be practical in use. The neck and mouth construction of the bottle is given sufficient reinforcement to accommodate and take care of the compression strains incidental to the application of the closure cap, this reinforcement being provided not only by the overlapped sides of the slits 86 but also by reason of the longitudinal beads 86' produced by the cooperating grooves 198 and ribs 198'. By reason of the mouth forming head 193, and by reason of the flared portion 196' of the pressing roller 213, a shoulder 85' is formed at the junction of the mouth and neck so as to provide a seat for the closure generally indicated at 85''. This shoulder formation is permitted by reason of the ample quantity of stock provided in the overlapped and pre-shortened marginal portion 89. It will be noted that the over-lapped marginal portions, generally indicated at 89'' in Figs. 19 and 20, and the adjacent overlapped edges of the slits 88, in one convolution of the body fabrication, are staggered relative to the corresponding overlapped portions in the next adjacent convolution so as to distribute more evenly the lines of reinforcement given by such overlapped parts throughout the mouth and neck of the container. This staggering disposition is illustrated in Fig. 20 while Fig. 19 discloses one convolution as having been completed and the next succeeding convolution just beginning to effect the desired stagger.

What is claimed is:

1. A machine for producing containers, comprising means for supplying blanks, means for cutting a plurality of T shaped slits in a blank adjacent a marginal portion thereof, means for overlapping portions of the marginal portion and the blank adjacent the slits, means for forming the overlapped blank into a container wherein the overlapping portions adjacent the slits reinforce each other and form a reinforced neck, said marginal portion being formed into a mouth, and means for applying a strip about the mouth to reinforce said mouth.

2. A machine for producing bottles, comprising means for supplying stock, blanking means for cutting slits in the stock to permit shortening of the neck forming portion thereof, printing means operable by said blanking means, and means for forming the slitted stock into a bottle with a contracted neck.

3. A machine for producing bottles, comprising a supply of stock, means for cutting a plurality of T shaped slits in the stock, means for overlapping portions of the stock adjacent the slits, and means for forming the stock into a bottle, wherein the overlapped portions reinforce each other.

4. A machine for producing a bottle with a contracted portion, comprising means for cutting a plurality of slits in a blank for such contracted portion, means for applying adhesive to the blank, means for overlapping the sides of the slits of the blank to pre-shorten such contracted portion, and means for forming the blank into a bottle, with the pre-shortened part forming the contracted portion.

5. A machine for producing containers, comprising a blank supply, means for cutting a plurality of slits in a blank adjacent one edge thereof, means for overlapping portions of the blank adjacent the slits to pre-shorten such edge of the blank for forming a contracted neck and mouth for the container, means for forming the overlapped blank into a container wherein the overlapped portions form a reinforced neck adjacent the pre-shortened edge thereof, means for applying a reinforcing strip about the mouth portion of the container, and means for forming a bottom at the opposite end of the container.

6. A machine for producing bottles, comprising a blank supply, means for cutting a plurality of substantially T shaped slits in a blank from the supply, means for winding the slitted blank into a bottle, and means acting prior to the winding means for overlapping the sides of the slits to pre-shorten the adjacent portion of the blank to provide a contracted part of the bottle during the winding operation.

7. A machine for producing bottles from strip material comprising means for cutting from the strip a body blank having a plurality of shorter and longer slits therethrough, the shorter of said slits being inwardly and angularly disposed to one edge of the blank to provide a marginal portion adapted to be folded upon itself to pre-shorten such marginal portion, and the longer of said slits each angularly extending from a respective shorter slit intermediate its extremes, the longer slits terminating short of the opposite marginal portion of the blank, means for folding the first marginal portion adjacent each shorter slit and also overlap the sides of the longer slits thereby reducing the length of the first marginal portion for forming a contracted neck of the container, means for rolling the modified blank into a bottle having a tapered neck, means for forming the marginal portion into a widened mouth during the rolling, and means for applying a second strip to said mouth to reinforce the same.

8. A machine for producing bottles, comprising means for providing a body blank with a plurality of short slits spaced inwardly from and angularly to one edge of the blank to define a marginal portion, means for providing a plurality of longer slits each extending angularly from the intermediate portion of a respective one of the shorter slits, means for overlapping the marginal portion adjacent each shorter slit and also overlapping the side portions of the longer slits to pre-shorten the adjacent portion of the blank, and means for forming the blank into a bottle having a tapered neck as provided by said pre-shortened blank portion.

9. A machine for producing bottles from sheet material, comprising means for cutting a body blank having a plurality of long and short slits therethrough, the shorter slits being inwardly and angularly disposed to one edge of the blank to provide a marginal portion and the longer slits angularly extending from the shorter slits, means for folding the marginal portion adjacent each short slit, whereby the sides of the long slits are also caused to overlap and reduce the one edge of the blank, means for applying an adhesive to a portion of said blank, and means for rolling a second strip about the reduced edge of the blank to reinforce the same.

10. The method of forming containers from a sheet blank, consisting in providing slits in the blank adjacent one marginal portion thereof, preshortening said marginal portion by overlapping the sides of the slit, and then rolling the sheet into a container form to provide a container with a contracted diameter at the preshortened part.

11. The method of forming containers with a contracted portion consisting in providing a blank with a weakened marginal portion, overlapping parts of said marginal portion to preshorten the same, and then rolling the blank into container form.

12. The method of forming containers with a contracted portion consisting in slitting a blank at intervals adjacent one marginal portion thereof to free the same from the body of the blank, folding the freed parts of said marginal portion to preshorten the same, rolling the blank into container form, and winding a reinforcing member about the contracted body portion.

FREDERICK C. FISK.